No. 780,174. PATENTED JAN. 17, 1905.
S. D. HEDGE.
WEIGHING MACHINE.
APPLICATION FILED JAN. 25, 1904.
5 SHEETS—SHEET 1.
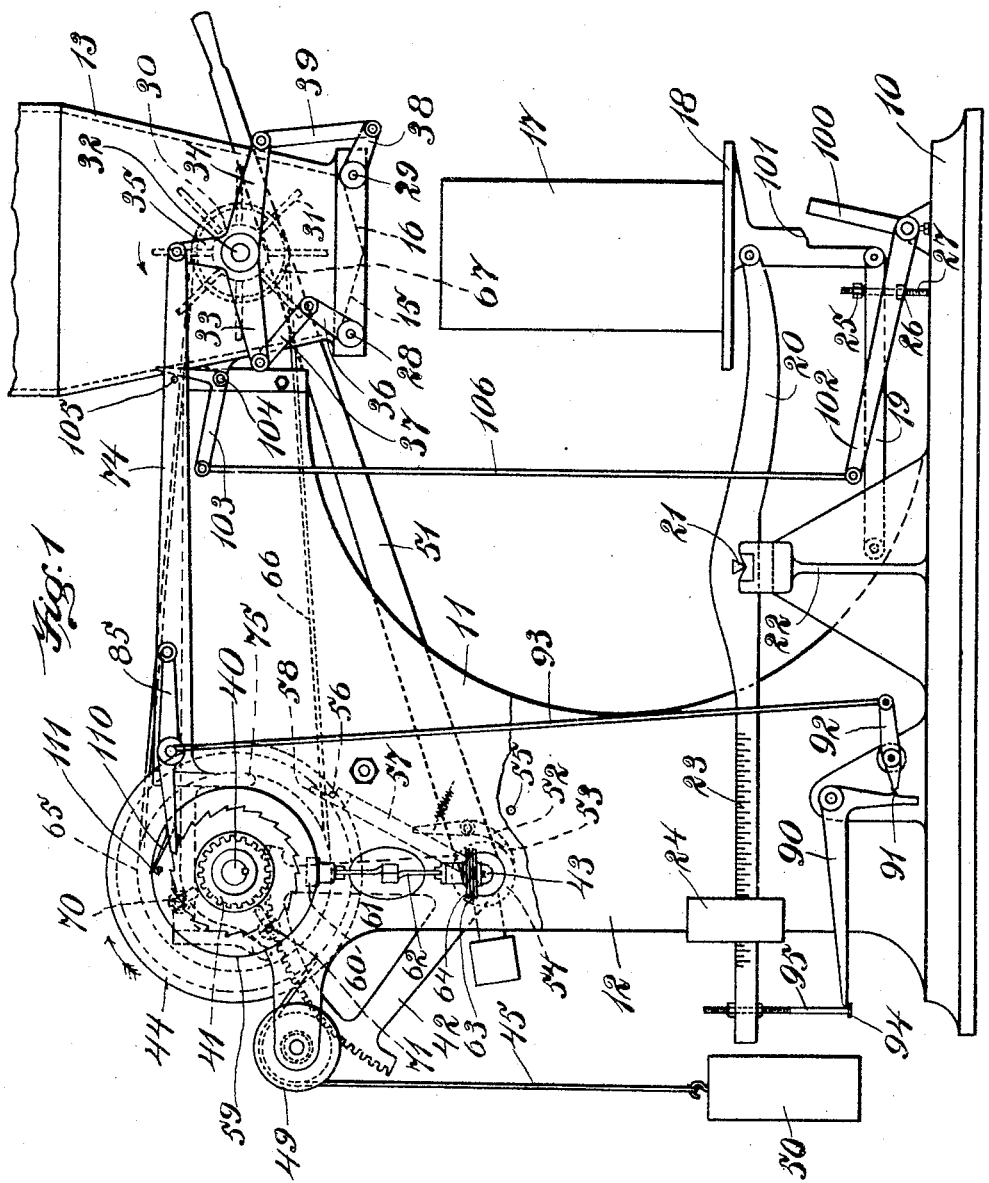

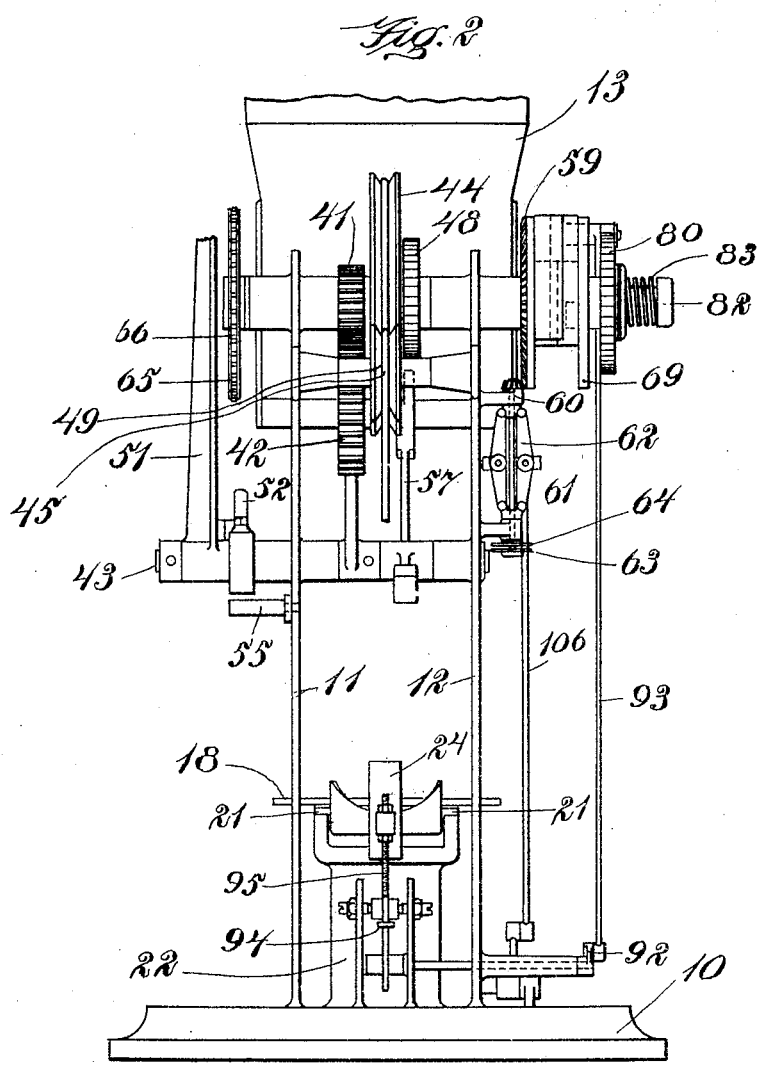

No. 780,174. PATENTED JAN. 17, 1905.
S. D. HEDGE.
WEIGHING MACHINE.
APPLICATION FILED JAN. 25, 1904.
5 SHEETS—SHEET 3.
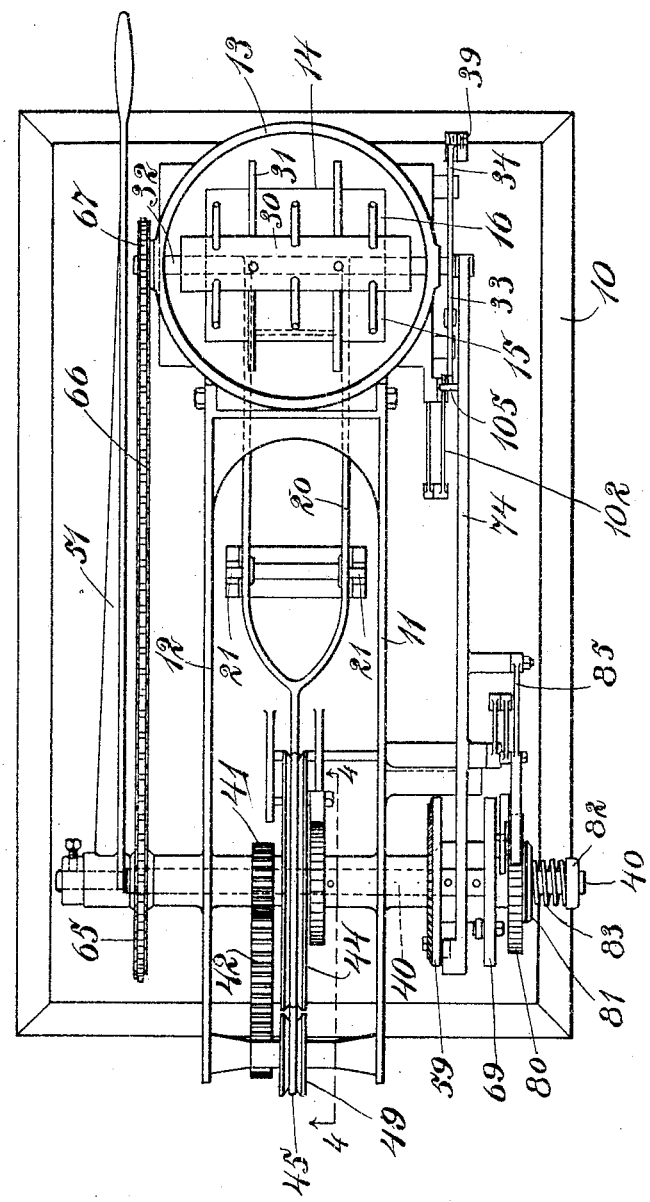

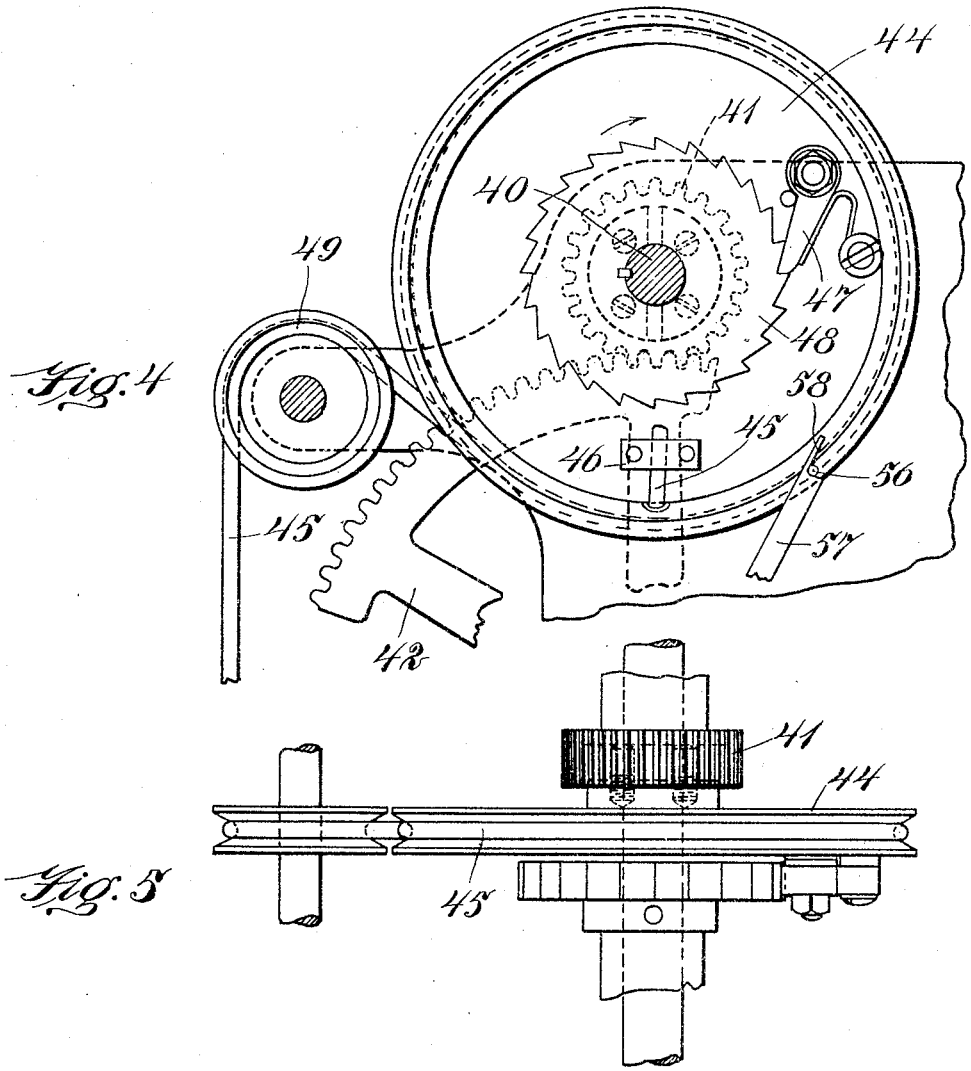

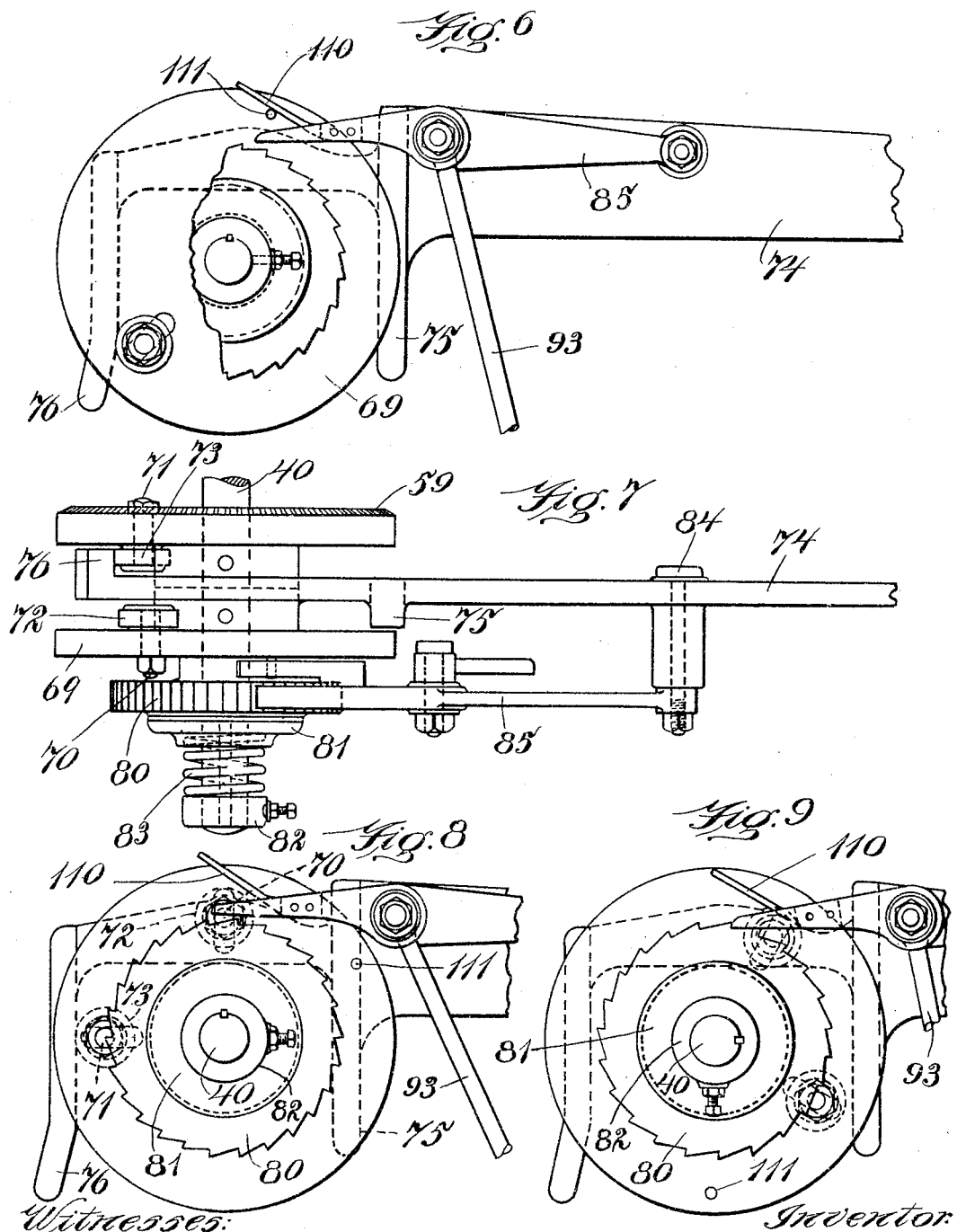

No. 780,174.                                    Patented January 17, 1905.

UNITED STATES PATENT OFFICE.

SILAS D. HEDGE, OF EVERETT, MASSACHUSETTS, ASSIGNOR TO CHARLES F. BROWN, TRUSTEE, OF READING, MASSACHUSETTS.

WEIGHING-MACHINE.

SPECIFICATION forming part of Letters Patent No. 780,174, dated January 17, 1905.

Application filed January 25, 1904. Serial No. 190,547.

*To all whom it may concern:*

Be it known that I, SILAS D. HEDGE, of Everett, in the county of Middlesex and State of Massachusetts, have invented certain new and useful Improvements in Weighing-Machines, of which the following is a specification.

This invention has relation to weighing-machines in which a predetermined weight of material is fed to a box, carton, or other receptacle on the scale-pan.

Primarily the object of the invention is to provide such a machine with mechanism by means of which various kinds of material may be accurately measured and weighed, so that each package of said material after leaving the machine does not vary in weight from all the others.

A secondary object of the invention is to provide a simple and durable machine which may be operated by an unskilled laborer without affecting the accuracy of its operation and which may be operated independently of counter-shafting or other motor-driven power-transmitting mechanism, in consequence of which the machine may be employed in a store or warehouse or in remote parts of the factory or other place where it is inconvenient to transmit power from the motor.

In attaining these objects the invention has been so devised that while the machine is *per se* a unity, yet its several parts may be employed independently of each other in other weighing-machines, as will be apparent from this specification.

Inasmuch as the most essential feature of the invention consists in the mechanism by which the material is accurately delivered to the weighing-pan and is cut off when the proper amount has been weighed, it may be stated first that the machine is illustrated as provided with a hopper for the reception of the material to be measured or weighed with one or more gates adapted to be opened and closed at the proper times. These gates are under the control of power mechanism by which they are automatically opened to permit a full or loading stream to flow from the hopper to the carton, box, or other receptacle upon the scale-pan and by which they are partially closed automatically at a predetermined time when the receptacle is filled to a certain extent to allow of the passage of a drip-stream from the hopper, which gradually fills the carton until it overbalances the scale-beam, immediately upon which said power mechanism is controlled by the scale-beam and caused to effect the complete closing of the gates to shut off the stream at the proper moment.

Preferably stored power is employed for effecting the automatic operations of the machine; but it will be borne in mind that the machine is so constructed that while the stored power effects certain operations at certain predetermined relative times, yet other operations of the machine are controlled by the movement of the scale-pan, so that it will be subsequently seen that the gates, for instance, are actuated by stored power and yet are under the control at certain times of the scale-beam. The power may be stored in any suitable means, although in the present embodiment of the invention it is stored by manual exertion through the medium of a lever. The particular device in which the power is stored is illustrated as a pendent weight from a flexible band which is wound upon a drum by the action of the hand-lever and suitable rachet mechanism. The machine is illustrated as so constructed that a single oscillation of the lever stores sufficient power for the measuring and weighing of a single mass of material. When the lever, which is manually operated to store the power, has been released, the machine is automatically set in motion, the weight causing the rotation of a shaft which through suitable mechanism automatically opens the gates to permit the flow of a loading-stream from the hopper and then closes the gates to a position to permit the passage of a drip-stream. Devices are interposed between the scale-beam and the gate-actuating mechanism in consequence of which when the scale-pan is depressed by the reception of the proper weight of material on said pan the gate-actuating mechanism is again connected by an auxiliary means with the said shaft to effect a full closure of said gates. It is desirable that the rotation of the shaft actuated from the stored power will be uniform, and therefore a governor is provided which accomplishes that end.

As the materials which are weighed by a machine of this character differ greatly in consistency, a stirrer or agitator is preferably located in the hopper and is connected to the power-driven shaft, so that as soon as the said shaft is set in motion the stirrer or agitator is actuated to cause the passage of the material in a stream of the proper size from the hopper.

Referring to the accompanying drawings, Figure 1 represents a side elevation of the machine embodying the invention. Fig. 2 represents a rear elevation. Fig. 3 represents a plan view of the machine. Figs. 4 and 5 represent the drum which is actuated by the manually-operated lever to raise the weight and store the power, Fig. 4 being a section on line 4 4, Fig. 3. Figs. 6, 7, 8, and 9 represent in detail the mechanism actuated by the shaft for operating the gate-actuating mechanism and also the means by which said gate-actuating mechanism is controlled in its operation by the scale-beam.

It will be understood that the terms and phraseology hereinafter employed are for the purpose of description and not of limitation.

Referring to the drawings which illustrate one embodiment of the invention, to which, however, the invention is not limited, 10 indicates the base, from which rise the parallel standards 11 12. These standards are suitably shaped, being projected forwardly to receive and support a hopper or chute or other material-delivering device 13 of any desired construction. The hopper is illustrated as in the shape of an inverted frusto-cone, though this is not at all material to the invention. The bottom of the hopper is formed with a rectangular opening 14, which is normally closed by gates 15 16. If but one gate is desired, the other may be stationary. These gates are actuated by power mechanism which will be subsequently described. The material is permitted to pass from the said hopper to a suitable receptacle 17, adapted to be placed by the operator upon the scale-pan 18. This pan is supported by the scale-beam 20, the said beam being fulcrumed at 21 upon the upright brackets 22 and the pan steadied by the link 19. The rear end of the scale-beam is provided with graduations 23 and also with adjustable counterweight 24. The limits of movement of the scale-beam are fixed by the nuts 25 26 on the upright 27, said nuts projecting into the path of the link 19.

Referring again to the hopper and gates, it will be observed that the gates are respectively pivoted at 28 29. In the hopper is an agitator consisting of a cylinder 30, having stirrer-blades 31. This cylinder is on a shaft 32, which projects through the walls of the hopper. Said shaft 32 is actuated by chain-and-sprocket gearing, as will be subsequently described. Upon one end of the shaft is fulcrumed a three-armed lever having arms 33 34 projecting in opposite directions and an arm 35, by means of which it is rocked about its pivot. To the pintle 28 of the gate 15 is connected an upwardly-projecting arm 36, connected by a link 37 with the end of the arm 33, whereas the pintle 29 for the gate 16 has a downwardly-projecting arm 38, connected by a link 39 with the arm 34 of a three-armed lever. As a consequence of this construction and arrangement of parts a movement of the three-armed lever in the direction of the arrow in Fig. 1 causes a simultaneous opening of both gates in a downward direction and a movement of said three-armed lever in a reverse direction causes the closing of the gates.

The means for storing power in the machine and for transmitting the stored power under the control of the scale-beam or the weight of the delivered material to the gates will now be described.

Referring to Figs. 1, 2, and 3, it will be observed that journaled in bearings on the standards 11 and 12 there is a main power-shaft 40. Loose upon the shaft is a pinion 41, intermeshing with a gear-segment 42, loosely mounted upon a shaft 43, journaled in bearings in the standards 11 and 12 immediately below the shaft 40. The pinion 41 is secured to a drum 44, which is grooved to receive a flexible band or cord 45, one end of which is secured thereto by a clip 46, as shown in Fig. 4. The drum carries a spring-pressed pawl 47, adapted to engage a ratchet 48, keyed to the shaft 40. Assuming that the shaft 40 is rotatable in but one direction—to wit, in the direction of the arrow in Fig. 4—it will be observed that when the gear-segment 42 is moved forward it rotates the drum 44 relatively to the ratchet 48, the pawl clicking idly by the ratchet as the drum rotates. The cord 45 passes from the drum 44 over a grooved idler-pulley 49 and is provided at its end with a weight 50, which is illustrated conventionally, but which, it will be understood, is heavy enough to rotate the shaft 40 and actuate the automatic mechanism of the machine. The power is stored in the weight 50; but when the drum is wound up it may be said to have the power in store to transmit it through the pawl 47 and the ratchet 48 to the shaft 40.

The means for actuating the gear-segment 42 includes a long hand-lever 51, which projects forwardly, so that its end is convenient of access to a person standing in front of the machine. Preferably this lever has its free end arranged at some distance above the floor or base of the machine, so that the operator, standing in front of the machine, may raise his arm and draw the lever downwardly to store the power. This is a matter of convenience, since it places the lever where it is out of the way and where it does not interfere with the operation of the mechanism at or near the base of the machine. Said lever is loosely journaled upon the shaft 43, and it is provided with a spring-tensioned pawl 52, (see dotted lines in Fig. 1,) adapted to engage a stop 53, formed on a collar 54, rigidly secured to the shaft. There is a tripping-stop 55 secured to the standard 12, so that after the hand-lever 51 has been moved downward to the proper point the tail of the pawl engages the stop so that the active end of said pawl is automatically thrown out of engagement with the stop 53, whereupon segment 42 is free to return to its initial position as the shaft 40 rotates by reason of the weight 50 dropping, for it will be remembered that when the lever 51 was depressed it effected a storage of power by the coiling of the cord 45 upon the drum and the consequent raising of the weight 50.

To limit the rotation of the drum in the direction of the arrow in Fig. 1, the rim of the drum is provided with an axially-projecting pin 56, adapted to engage the shouldered end of a counterweighted lever 57, fulcrumed upon the shaft 43. The end of said lever is provided with a projecting finger 58, so that the drum may be rotated a complete reverse rotation in winding the cord upon the drum, so that as the weight falls said drum may be given a complete rotation in the opposite direction to effect a complete rotation of the shaft 40. In order that the shaft may be caused to rotate at an unvarying rate of speed to properly time the partial closing of the gates, as will be described, a governor is employed which may be of any particular style or kind. As illustrated in the drawings, and more particularly in Fig. 2, the shaft 40 is shown as provided with a disk 59, having bevel gear-teeth intermeshing with the pinion 60 of a governor, (indicated as a whole at 61.) The governor is here shown as of the brake type, with outwardly-swinging arms 62, connected to a friction-disk 63, adapted to be brought by the outward movement of said arms into engagement with a stationary friction-disk 64.

For the purpose of transmitting power from the shaft 40 to the agitator or stirrer-shaft 32 said shaft is provided with a sprocket-wheel 65, connected by a sprocket-chain 66 with a sprocket-wheel 67 on the shaft 32. By reason of this connection the initial rotation of the shaft 40 causes an immediate rotation of the stirrer, the ratio of the two sprocket-wheels being such that the stirrer is driven at an accelerated speed.

The connection between the gates and the shaft 40 includes the following power-transmitting mechanism: At a short distance from the disk 59 is a disk 69, confronting the untoothed face thereof. These two confronting disks or members 59 and 69 are both fast on the shaft 40 and are provided with radial slots for the reception of pins 70 and 71, respectively, on which are journaled rolls 72 73, respectively. The two members 59 and 69 are so arranged on the shaft that one roll is ninety degrees, more or less, in advance of the other roll; but said members 59 and 69 may be rotatively adjusted about the shaft 40. Arranged between the two members 59 and 69 and resting on the hubs thereof is a forked slide-bar or reciprocatory member 74, having downwardly-projecting fingers 75 76, arranged on opposite sides thereof and adapted to be engaged alternately and respectively by the rolls 72 and 73. The forward end of the slide-bar 74 is connected to the arm 35 of the three-armed lever previously referred to. As a consequence of this construction it will be observed that the alternating engagement of the rolls 72 and 73 with the fingers 75 and 76 will effect a reciprocation of the slide 74 first to the right and then to the left to open and then close the gates, as the case may be. The finger 75 is so spaced, however, that even though the slide be moved to the right by the roll 72 it will not entirely close the gates 15 and 16, but will only partially close them, so that there will be escaping from the gates what has been termed a "drip-stream"—that is, a thin stream of the material—by which the final weight may be added to the mass of material already on the scale-pan. When the shaft 40 commences its rotation under the influence of the stored power, the gates are first opened wide by the engagement of the roll 73 with the finger 76, which moves the slide 74 to the left. After a predetermined time the roll 72 engages the finger 75 and partially closes the gates, so as to cut off the loading-stream and permit the passage of the drip-stream. Then when the exact weight of material has been deposited upon the scale-pan and as it drops automatic mechanism is provided by which the continued rotation of the power-shaft 40 effects the final closure of the gate. This final closure of the gate is therefore directly effected by the power mechanism, but is controlled by the scale-beam or weight of the delivered material, so that there is no work for the scale-beam to do but simply connect the power mechanism with the slide 74, and this may be accomplished by pawl-and-ratchet mechanism, as will be explained.

Referring to Figs. 1, 8, and 9, on the shaft 40 is placed a clutch member 80, formed as a ratchet held frictionally against the hub of the disk 69 by a spring-pressed disk 81, between which and a collar 82, keyed on the shaft, there is a spring 83. The ratchet is caused thereby to rotate frictionally with the shaft. Pivoted upon a pin 84, projecting laterally from the slide 74, there is a clutch member formed as pawl 85, which when dropped into the position shown in Fig. 9 is adapted to be engaged by the ratchet 80, so as to impart the final movement to the slide 74 and effect a complete closure of the gates. This pawl is held in inactive position, when the weighted end of the scale-beam is in its normal depressed position, by devices shown in Fig. 1.

90 indicates a two-armed lever having a stop 91, normally engaged by a latch 92. The outer free end thereof is connected to the pawl 85 by a rod 93, so as to hold the latter in a raised inactive position, as shown in Fig. 6. The stop is maintained in engagement with the latch until the weighted end of the scale-beam rises, at which time the head 94 of an adjustable pin 95, secured to said end of the scale-beam, rocks the two-armed lever 90, releases the latch 92, and thereby permits the pawl 85 to drop into the position shown in Fig. 1 to connect the member 74 to the power mechanism. The continued rotation of the ratchet therefore effects the complete closure of the gates; but as the ratchet 80 is only frictionally connected with the shaft 40 said shaft may continue thereafter to rotate without danger of breakage of the parts.

In order that the pawl 85 may be disengaged from the ratchet 80 and to permit the stop 91 to engage the latch 92 when the scale-beam is in its unloaded position, said pawl is provided with a cam-finger 110, adapted to be engaged by a pin or projection 111 on the member 69. This pin or projection is so located upon said member that the first movement of the shaft 40 effects the lifting of the pawl 85 from an active to an inactive position.

There remains to be described only the device which blocks the downward movement of the scale-pan when the loading-stream is first delivered into the receptacle on the scale-pan. This device consists of a pivoted abutment 100, adapted to be rocked beneath a shoulder 101 upon the scale-pan. Connected to the abutment is a longer arm 102, which is adapted to drop of its own weight, so as to hold the scale so that the abutment will normally occupy a position under the scale-pan and prevent it from being depressed. For the purpose of removing the abutment from beneath the scale-pan the bell-crank lever 103 is fulcrumed on the head 104. One arm of said lever projects into the path of a pin 105 on the slide 74, whereas the other arm of said lever is connected by a rod 106 with the said arm 102. The pin 105 is so placed upon the slide 74 that it does not engage the bell-crank lever until said slide has been moved to a position to change the gates from a wide-open position to a partially-closed position and cut off the full stream to a drip-stream. The pin oscillates the bell-crank about its pivot and moves the abutment to the position shown in Fig. 1.

Having thus explained the nature of the invention and described a way of constructing and using the same, although without attempting to set forth all of the forms in which it may be made or all of the modes of its use, I declare that what I claim is—

1. A weighing-machine comprising a material-delivering device having a gate, power mechanism having a clutch member, means actuated by said power mechanism for moving said gate from an open position to a partially-closed position, a weighing device and means automatically controlled by said weighing device in consequence of which said power mechanism actuates said means to completely close said gate, said means including a clutch member engaged with the first-mentioned clutch member by a predetermined weight of the delivered material.

2. A weighing-machine comprising a material-delivering device having a gate, power mechanism having a clutch member, means actuated by said power mechanism for partially closing said gate to change the load-stream to a drip-stream, a scale-pan, and mechanism including a complemental clutch member controlled by said scale-pan, for connecting said means to said power mechanism and thereby effecting a complete closure of said gate.

3. A weighing-machine comprising a hopper having a gate, a weighing-scale having a pan, a moving power-transmitting device, means actuated by said device for partially closing said gate, and means actuated by said device and controlled by said weighing-scale, for completely closing said gate when said pan drops on account of the weight of the material thereon, said means including a clutch, the members of which are engaged by a predetermined weight of the delivered material.

4. A weighing-machine comprising a power-shaft having a clutch member, a hopper having a gate, means actuated by said shaft at a predetermined point in its rotation to partially close said gate, a weighing-scale, and means including a complemental clutch member controlled by said scale for causing said power-shaft to completely close said gate irrespective of the extent to which said shaft has been rotated.

5. A weighing-machine comprising a power-shaft having a clutch member, a hopper having a gate, means actuated by said shaft at a predetermined point in its rotation to partially close said gate, and means including a complemental clutch member and devices actuated by the weight of the delivered material for causing said clutch member to engage the first-mentioned clutch member and completely close said gate.

6. A weighing-machine comprising a material-delivering device having a gate, a power mechanism timed to partially close said gate automatically, and means automatically controlled by the weight of the delivered material for causing said power mechanism to completely close said gate, said means including clutch members and devices actuated by the weight of the delivered material for engaging said members.

7. A weighing-machine comprising a material-delivering device having a gate, a power-shaft, power-transmitting devices intervening between said shaft and said gate to cause a partial closure of said gate, and auxiliary means controlled by the weight of the delivered material for connecting said power-transmitting devices to said shaft to effect by power the complete closure of said gate.

8. A weighing-machine comprising a material-delivering device having a gate, a power-shaft having a power-transmitting device thereon, an element actuated by said power-transmitting device and connected to said gate to partially close it, a second power-transmitting device on said shaft, and means controlled by the weight of the delivered material for connecting said element to said second power-transmitting device to effect a complete closure of said gate.

9. A weighing-machine comprising a material-delivering device having a gate, a power-shaft having a power-transmitting device thereon, an element actuated by said power-transmitting device and connected to said gate to partially close it, a ratchet on said shaft, a pawl on said element normally disengaged from said ratchet, and means actuated by a predetermined weight of the delivered material to engage the pawl with said ratchet and thereby effect the comptete closure of said gate.

10. A weighing-machine comprising a material-delivering device having a gate, a power-shaft having a power-transmitting device thereon, an element actuated by said power-transmitting device and connected to said gate to partially close it, a second power-transmitting device frictionally mounted on said shaft, and means controlled by the delivered material for causing said element to be actuated by said second power-transmitting device when said delivered material reaches a predetermined weight and thereby effect a complete closure of said gate.

11. A weighing-machine comprising a material-delivering device having a gate, a power-shaft having a power-transmitting device thereon, an element actuated by said power-transmitting device and connected to said gate to partially close it, a ratchet on said shaft, a pawl on said member, a scale-beam, and tripping mechanism for causing said pawl to engage said ratchet when the scale-beam is moved by the weight of delivered material.

12. A weighing-machine comprising a material-delivering device having a gate, a power-shaft having a clutch member, a movable element connected to said gate, means on said shaft and coacting with said movable element to first open said gate and to subsequently partially close it, a clutch member, and means actuated by the weight of the delivered material and adapted to connect said element with the clutch member on said shaft to effect the complete closure of said gate.

13. A weighing-machine comprising a hopper having a gate and also having a stirrer therein, driving mechanism having a uniform speed of motion, means connecting said driving mechanism to said stirrer, mechanism for connecting said driving mechanism with said gate to partially close it, a scale, and means controlled by said scale for again connecting said driving mechanism with said gate to completely close said gate.

14. A weighing-machine comprising a material-delivering device having a gate, a power-shaft, a gate-opening member and a gate-closing clutch member, and intermediate gate-operating mechanism coöperating with the said members in opening and closing the gate, said mechanism including a clutch member and means actuated by a predetermined weight of the delivered material to cause said clutch member to engage the first-mentioned clutch member and thereby effect the closure of the gate.

15. A weighing-machine comprising a material-delivering device having a gate, a power-shaft, a gate-closing element, a clutch member actuated by said shaft, a complemental clutch member engaged with said element and means actuated by a predetermined weight of the delivered material to cause said clutch member to engage the first-mentioned clutch member and thereby effect the closure of the gate.

16. A weighing mechanism comprising a material-delivering device having a gate, a gate-operating element, a power-shaft having means for coöperating with said element to open the gate, a clutch member actuated by said shaft, a complemental clutch member engaged with said element and means actuated by a predetermined weight of the delivered material to cause said clutch member to engage the first-mentioned clutch member and thereby effect the closure of the gate.

17. A weighing-machine comprising a material-delivering device having a gate, a power-shaft (having a timed power-transmitting device thereon), a gate-closing element, a clutch member actuated by said shaft, and a complemental clutch member engaged with said element and means actuated by a predetermined weight of the delivered material to cause said complemental clutch member to engage the first-mentioned clutch member and thereby effect the closure of the gate.

In testimony whereof I have affixed my signature in presence of two witnesses.

SILAS D. HEDGE.

Witnesses:
 MARCUS B. MAY,
 C. C. STECHER.